United States Patent [19]

Traut

[11] Patent Number: 5,790,825
[45] Date of Patent: Aug. 4, 1998

[54] METHOD FOR EMULATING GUEST INSTRUCTIONS ON A HOST COMPUTER THROUGH DYNAMIC RECOMPILATION OF HOST INSTRUCTIONS

[75] Inventor: Eric P. Traut, Cupertino, Calif.

[73] Assignee: Apple Computer, Inc., Cupertino, Calif.

[21] Appl. No.: 906,375

[22] Filed: Aug. 5, 1997

Related U.S. Application Data

[63] Continuation of Ser. No. 555,166, Nov. 8, 1995, abandoned.
[51] Int. Cl.[6] .................................................. G06F 9/455
[52] U.S. Cl. ........................................... 395/385; 395/500
[58] Field of Search .................................. 395/385, 386, 395/387, 568, 416, 417, 500, 800.23, 800.41

[56] References Cited

U.S. PATENT DOCUMENTS

| | | | |
|---|---|---|---|
| 4,574,344 | 3/1986 | Harris et al. | 395/500 |
| 4,635,188 | 1/1987 | Williamson et al. | 395/388 |
| 4,638,423 | 1/1987 | Ballard | 395/500 |
| 4,761,733 | 8/1988 | McCrocklin | 395/421.02 |
| 5,333,287 | 7/1994 | Buerkle et al. | 395/387 |
| 5,406,644 | 4/1995 | MacGregor | 395/500 |
| 5,430,862 | 7/1995 | Smith et al. | 395/500 |
| 5,481,693 | 1/1996 | Blomgren et al. | 395/566 |
| 5,546,552 | 8/1996 | Coon et al. | 395/385 |

*Primary Examiner*—Parshotam S. Lall
*Assistant Examiner*—Viet Vu
*Attorney, Agent, or Firm*—Fliesler, Dubb, Meyer & Lovejoy

[57] ABSTRACT

An architecture and method for emulating guest instructions with host instructions, executable on a host computer, based on a translation scheme. The architecture includes a guest instruction memory and program counter and a RAM memory storing host instructions, in which an address word stored in the program counter is mapped to the RAM memory to access the host instructions. The method constitutes dynamically recompiling (DR) host instructions including providing one memory which stores host instructions, providing in other memory having line entries for storing a fixed number of dynamically recompiled host instructions, and copying a host instruction from the one memory into a line entry of the other memory.

14 Claims, 10 Drawing Sheets

Guest ⁓ BTST.B (A3)

Host ⁓
```
mr addr, a3
bl btst_b_mem
lhau prefetch_data, 2 (pc)
bt cr_sp_event, handle_special_event
```

FIG. 3B

Guest ⁓ MOVEA.L D0, (A0) +

Host ⁓
```
lwz d0,0 (a0)
addi a0, a0, 4
lhau prefetch_data, 2 (pc)
bt cr_sp_event, handle_special_event
```

FIG. 4

Guest — MOVEA.L D0, (A0) +

Host:
- lwz d0, 0 (a0)
- addi a0, a0, 4
- lhau prefetch_data, 2 (pc)
- b dispatch_next_pc dispatch_next_pc:
  bt cr_sp_event, handle_special_event

- compute line that maps to current PC
- is PC's instruction in cache?
- if so, branch to correct entry
- if not, reallocate line and recompile code

FIG. 5

Guest — BTST.B $4554 (A3)

Host:
- la addr, prefetch_data (a3)
- bl btst_b_mem
- lhau prefetch_data, 4 (pc)
- b S+16
- bl generate code for this entry
- bl dr_code_block_start
- lhau prefetch_data, 2 (pc)
- bt cr_sp_event, handle_special_event

FIG. 6A

Guest ⁓ ADDQ.L #3,DI

Host ⁓
```
li data,0x0003
addco. d1, data, d1
lhau prefetch_data, 2 (pc)
mfxer ccr_x
```

FIG. 6B

Guest ⁓ ADDQ.L #3,DI

Host ⁓
```
li data,0x0003
bl add_l_data_d1
lhau prefetch_data, 2 (pc)
b dispatch_next_pc
```

```
add_l_data_d1:
    addco. d1,data,d1
    mfxer ccr_x
    blr
```

```
CLR.B D5    ~Guest

Dynamically recompiled code path:

rlwinm   d5, d5, 0, 0, 23                      # clear low-order byte of d5
    addco.   zer, zero, zero                       # update c and z bits of ccr
    lhau     prefetch_data, 2(pc)                  # load executed in parallel
    bt       cr_sp_event, handle_special_ event    # normally folded out Interpretive emulator code path:

rlwinm   d5, d5, 0, 0, 23                      # clear low-order byte of d5
    b        update_nzvc_zero                      # folded out update_nzvc_zero:
    rlwimi   disp_table,prefetch_data, 3, 13, 28
    mtlr     disp_table
    lhau     prefetch_data, 2(pc)                  # load executed in parallel
    addco.   zero, zero, zero                      # update c and z bits of ccr
    bflr     cr_sp_event                           # cannot be folded
    b        handle_special_event
```

FIG. 10

ADDQ.W #4, D2 — Guest

Dynamically recompiled code path:

lis     data, 0x0004
    bl     dr_add_w_shifted_data_d2 dr_add_w_shifted_data_d2:

| | | |
|---|---|---|
| slwi | immed_data, d2, 16 | |
| addco. | data,data,immed_data | |
| rlwimi | d2,data,16,16,31 | |
| mfxer | ccr_x | |
| blr | | # folded out |
| | | |
| lhau | prefetch_data,2(pc) | # update pc |
| bt | cr_sp_event, handle_special_event | # normally folded out |

Interpretive emulator code path:

| | | |
|---|---|---|
| lis | data, 0x0004 | |
| b | add_w_shifted_data_d2 | # folded out | add_w_shifted_data_d2:

| | | |
|---|---|---|
| slwi | immed_data, d2, 16 | |
| addco. | data,data,immed_data | |
| rlwimi | d2,data,16,16,31 | |
| mfxer | ccr_x | |
| b | fetch | # folded out | fetch:

| | | |
|---|---|---|
| rlwimi | disp_table,prefetch_data, 3, 13, 28 | |
| mtlr | disp_table | # two cycles on 603 |
| lhau | prefetch_data, 2(pc) | |
| bflr | cr_sp_event | # two cycles |
| b | handle_special_event | |

1

METHOD FOR EMULATING GUEST INSTRUCTIONS ON A HOST COMPUTER THROUGH DYNAMIC RECOMPILATION OF HOST INSTRUCTIONS

This application is a continuation of Ser. No. 08/555,166, filed Nov. 8, 1995, now abandoned.

FIELD OF THE INVENTION

The present invention relates to a method and an apparatus for emulating guest instructions on a host computer and, more particularly, to a scheme for translating guest instructions to host instructions executable on the host computer.

BACKGROUND OF THE INVENTION

Computers have general purpose central processing units (CPU) which are designed to execute a specific set of instructions. Thus, a CPU of one family, such as the Motorola 680X0 family of processors, manufactured by Motorola, Inc., Phoenix, Ariz., executes instructions unique to this family, a CPU of another family, such as the Intel 80X86 manufactured by Intel Corp., Sunnyvale, Calif., executes instructions unique to that family, and a PowerPC processor family, used in a Macintosh computer manufactured by Apple Computer, Inc., Cupertino, Calif., executes instructions specific to that family. These instructions comprise part of the operating systems of the respective computers in which the respective CPUs reside. Typically, application software programs are then written to run on the respective operating systems.

A computer manufacturer will design a computer system with a given CPU and will want to maximize market penetration by having more rather than fewer applications software being able to run on its system. For example, as indicated above, Apple Computer manufactures the PowerPC-based Macintosh line of computers. Applications software that has been written to run on operating systems for the Motorola 680X0 family, for example, may not all run on the PowerPC-based machines. Accordingly, a field of technology has developed in which a given computer having one type of CPU, called a host, will include an emulator that allows the host computer to emulate the instructions, called the guest, of another type of CPU. Thus, the host computer will have stored in memory guest instructions that may be called in response to applications software, host instructions emulating the guest instructions and executable by the host CPU, and an emulator that causes one or more host instructions to be executed in response to a given guest instruction. Thus, the given computer can execute host instructions of its own machine, and through emulation execute guest instructions.

Two main types of emulation strategies currently are available in the emulation field. The first strategy is known as "interpretation", in which each guest instruction is decoded in turn as it is addressed, causing a small sequence of host instructions then to be executed that emulate the guest instruction. The overhead, in terms of speed, for decoding each guest instruction each time the guest instruction is called is relatively small, but present for each instruction. Consequently, a given guest instruction that is addressed and, hence, decoded, many times in the course of running a program will slow the execution time of the overall program being run, i.e., overhead will increase.

The other main emulation strategy is known as "translation", in which the guest instructions are analyzed and decoded only once, i.e., the first time they are addressed. Upon the one-time decoding, the host instruction stream is generated and stored in memory, usually a RAM memory which may be a cache memory. Consequently, subsequent emulations of the same guest instruction may be performed quickly because the decoding overhead is nonexistent.

The translation strategy, while advantageous relative to the interpretation strategy, may have some drawbacks. One disadvantage is that since the time required to generate the overall host instruction stream is relatively extensive, the translation strategy may be slower for code which is executed only once. A second disadvantage of the translation scheme is the necessity for a relatively large buffer or cache memory. A block of memory in the host computer's memory address space is set aside to store the host instruction stream generated during the initial translation process. If this block of memory is large enough to contain the entire translated host instructions, emulation will proceed at the maximum rate since, in response to a given guest instruction, the RAM memory can be quickly addressed to access the corresponding sequence of host instructions for execution. However, it often is too expensive to set aside a large enough RAM memory. Furthermore, it may also be impossible to determine how large a RAM memory must be allocated in the computer's memory address space to contain the entire translated program.

Yet another disadvantage to the translation mechanism is the overhead in terms of speed for tracking "host code fragments" and associating them with specific basic blocks within the guest instruction stream. Code fragmentation occurs when there is an inefficient allocation of memory space such that information cannot be stored in contiguous space.

Furthermore, when a branch or other change in host program flow is encountered, the translating emulator must use some mechanism to determine if the next target guest instruction has been already translated. If it has, the emulator must determine the address of the translated host instructions within the RAM memory to execute the branch routine. If it has not, then a memory replacement scheme must be initiated to overwrite the RAM with translated code, which is relatively time consuming.

Consequently, a competing interest exists between the size of the RAM memory and the translation overhead. If the RAM memory is relatively large, the translation overhead will be relatively low, but at the high cost of memory. If the RAM is small, reducing memory cost, the translation overhead may be high due, for example, to continually writing new translated code to the RAM.

SUMMARY OF THE INVENTION

The present invention is a translation emulator that has the advantages of requiring a smaller RAM memory while at the same time providing for lower translation overhead. The translation overhead and the memory are both kept relatively small without greatly degrading performance.

In one aspect, the present invention comprises an architecture for emulating guest instructions with host instructions executable on a host computer, comprising: (a) a guest instruction program memory storing guest instructions; (b) a guest instruction program counter storing address words corresponding to the guest instructions, respectively; (c) a memory having a plurality of lines, each of the lines having a plurality of line entries storing a fixed number of host instructions emulating one of the guest instructions, respectively; and (d) means for mapping the guest instruction program counter address word to said memory to access the host instructions.

In another aspect, the invention is a method of emulating guest instructions with host instructions executable on a host processor, comprising the steps of: (a) determining the length of one of the guest instructions; (b) generating a multi-word entry of host instructions in a memory if the length is greater than a certain number of bytes; (c) generating an inline entry of host instructions in the memory if the guest instruction is not greater than the certain number of bytes and the inline entry can store a predetermined number of host instructions; and (d) returning to step (a) above to calculate the length of a next guest instruction.

In yet another aspect, the present invention is a method of dispatching host instructions corresponding to a guest instruction and executable on a host processor, comprising the steps of storing a guest instruction in a first memory, generating an address having a first tag and corresponding to the guest instruction, storing in a second memory a line of host instructions and a second tag corresponding to the line, mapping the address to the second memory to access the second tag, comparing the first tag and the second tag, and executing the host instructions if the first tag and the second tag match, or filling the second memory with other host instructions and another tag corresponding to the first tag of the address if the first tag and the second tag do not match.

In still another aspect, the present invention comprises a method of dynamically recompiling host instructions executable on a host processor and emulating guest instructions, comprising the steps of providing a first memory storing the host instructions, providing a second memory having lines with line entries used for storing a fixed number of dynamically recompiled host instructions, and copying a host instruction from the first memory into a line entry of a line of the second memory.

DETAILED DESCRIPTION OF THE INVENTION

I. Overall Translation Emulating System

Figure 1:
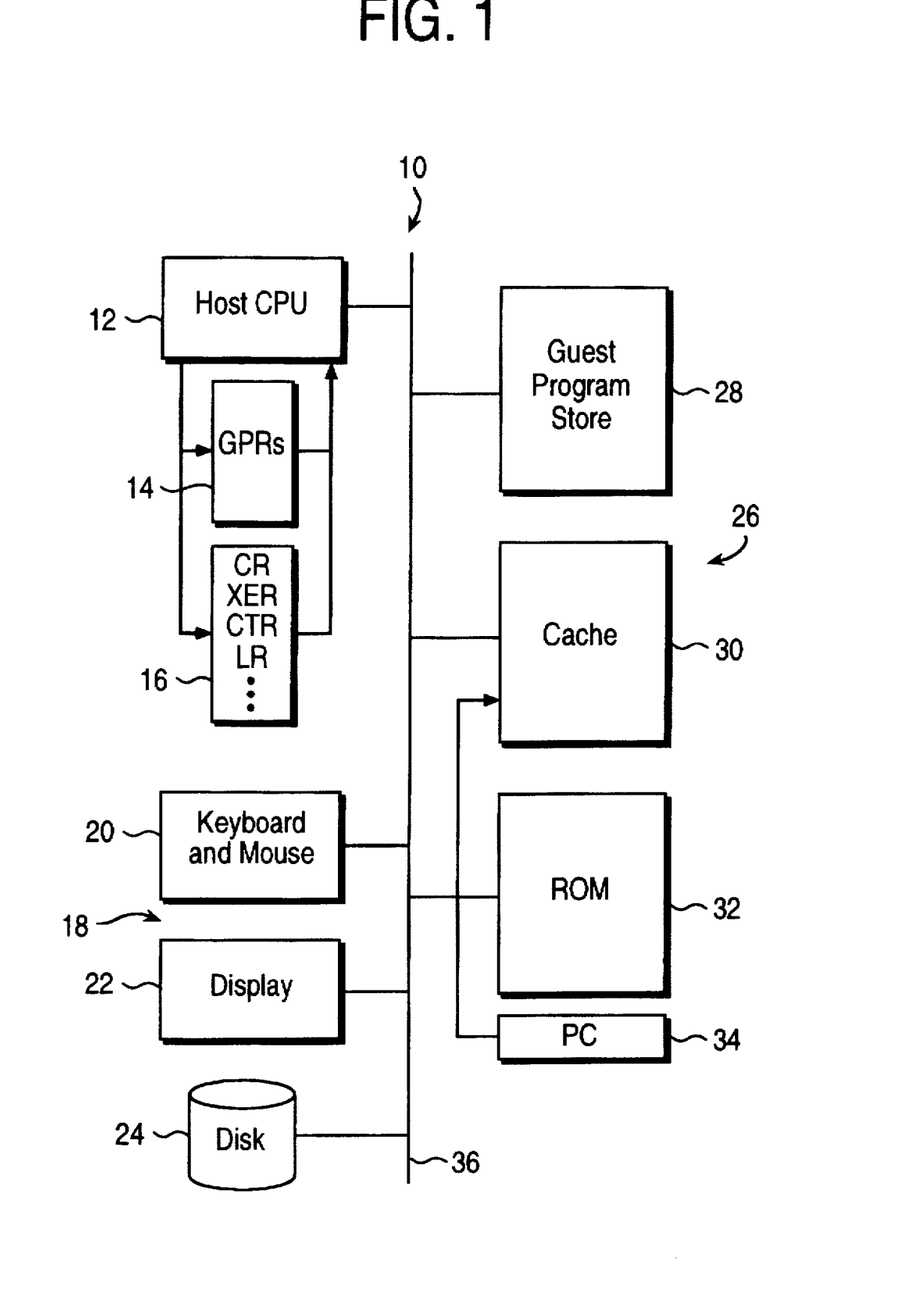
FIG. 1 is a schematic block diagram of a computer system implementing the present invention.

FIG. 1 illustrates a host computer 10 which has hardware and software to emulate guest instructions according to the translation scheme of the present invention. The host processor 10 includes a CPU 12 having, for example, on-chip general purpose registers 14 and special purpose registers 16. The CPU 12 will execute host instructions that emulate the guest instructions.

Other hardware components of the computer 10 include input and output devices shown generally at 18, including a keyboard and mouse 20, a display 22 and a peripheral memory system 24 which may be, for example, a hard disk drive.

The host computer 10 includes additional memory in its addressable memory space shown generally at 26. The memory 26 includes a guest program store 28 which stores guest instructions, a random access memory (RAM) such as a cache 30 which stores host instructions and other information, and a read only memory (ROM) 32 which stores, among other information, host instruction routines and tables described more fully below. A guest instruction program counter (PC) 34 is used to store an address word AW which, in addition to identifying the guest instruction to be emulated, maps to the cache 30 to access the emulating host instructions.

A system bus 36 provides for communication amongst the illustrated hardware components of computer system 10.

In the overall general operation of the computer system 10 in relation to emulation, assume that the guest instructions stored in memory 28 have been initially translated to host instructions which may be stored in the cache memory 30 and ROM 32. When a guest instruction in memory 28 is identified via the address word AW in the PC 34, the cache memory 30 will be addressed to access the emulating host instructions. If the cache memory 30 is storing the emulating host instructions, then execution of these host instructions by the CPU 12 will commence. In the course of this execution, and as will be further described, the host instructions needed for emulating the guest instruction also may reside in the ROM memory 32 to which a branch will be made to continue to access the emulating host instructions for execution by the CPU 12. If the cache memory 30 is not storing the emulating host instructions corresponding to the address word AW for the given guest instruction, then a cache replacement scheme is initiated, whereby the appropriate host instructions will be written to the cache memory 30. Thereafter, execution of the host instructions emulating the guest instruction will continue.

II. The Memory Map and Memory Mapping

Figure 2A:
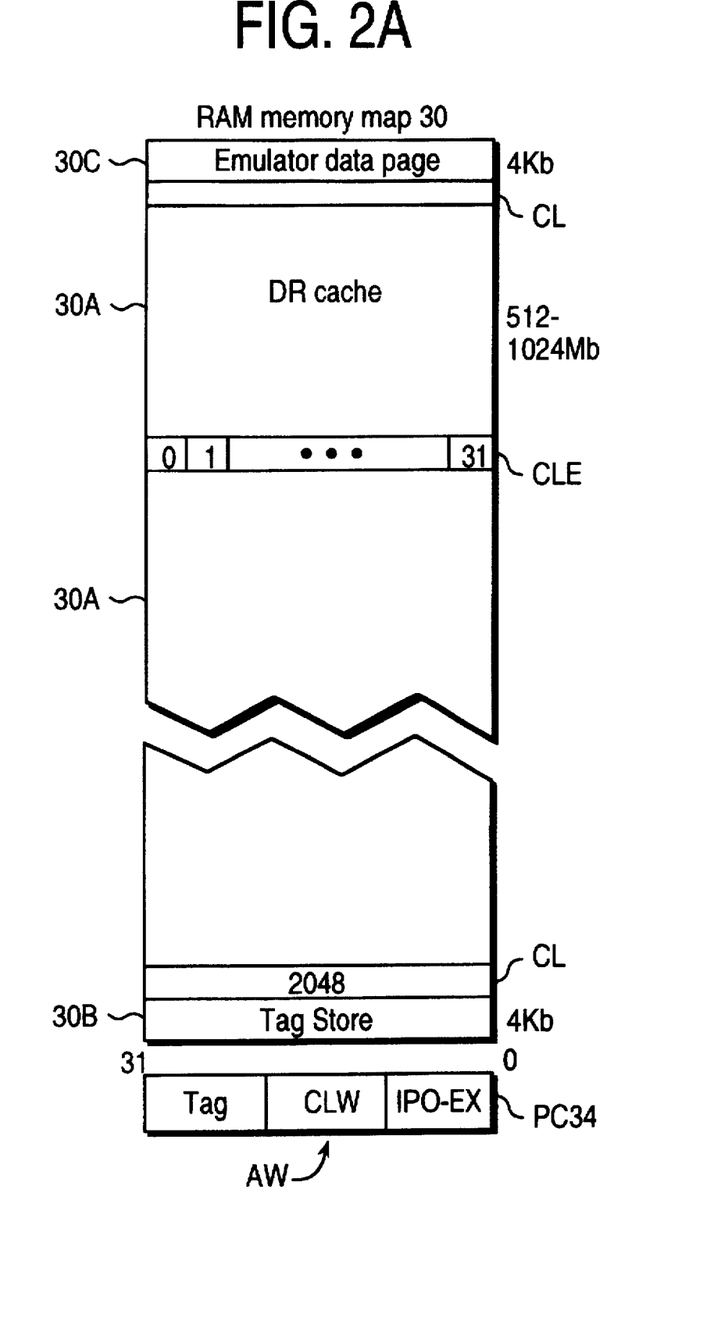
FIG. 2A and FIG. 2B are emulator memory maps of the present invention.
Figure 2B:
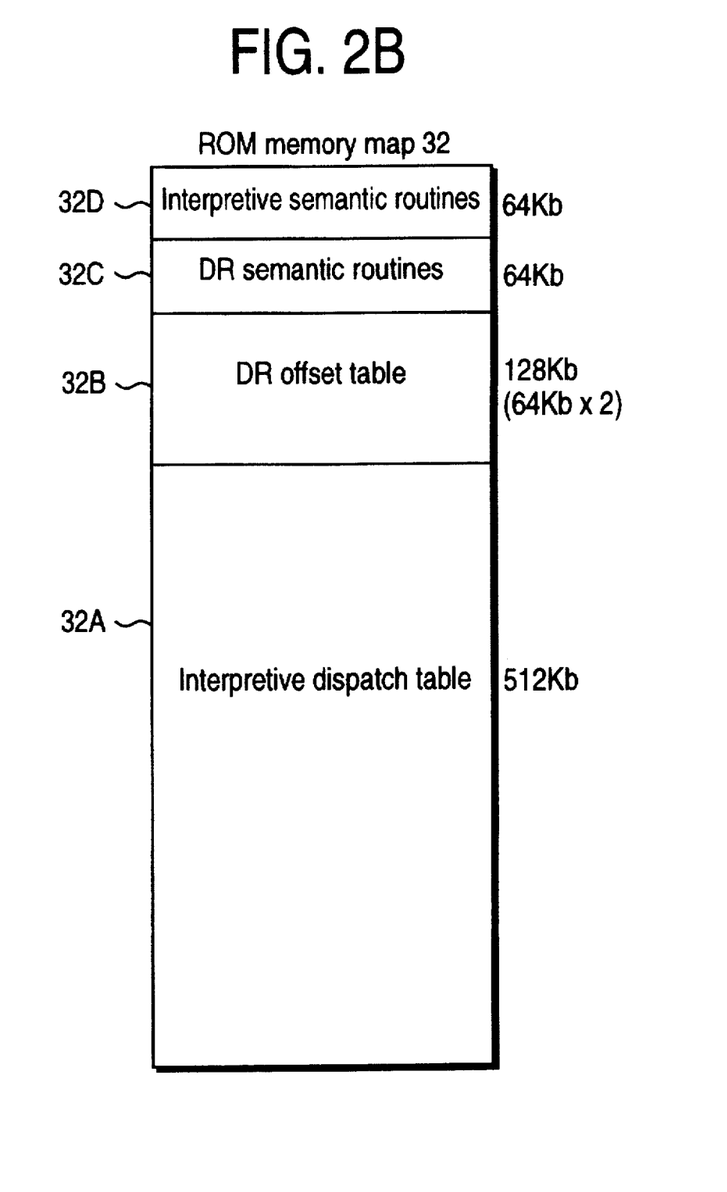

FIG. 2A and FIG. 2B illustrate the memory map comprising cache 30 and ROM 32 which store host instructions emulating the guest instructions stored in memory 28 (see FIG. 1). These host instructions have been initially translated once from the guest instructions, and have then been "dynamically recompiled" (DR) as stored host instructions in cache 30 and ROM 32. The cache 30 is divided into three sections, which are (1) a section 30A identified as the DR Cache that stores a portion of the emulating host instructions, (2) a section 30B identified as the Tag Store, that stores a tag which maps to a certain range of PC 34 addresses, and (3) a section 30C which is identified as the Emulator Data Page.

The DR Cache 30A may be scalable, for example, from 256 KB to 2 Mb of memory scaled by factors of 2, which is a range providing for a relatively small RAM footprint.

The Tag Store 30B has a size which is dependent on the size of the DR Cache 30A. For example, a 1Mb DR Cache 30A will contain 2048 ($2^{11}$) cache lines CL shown in FIG. 2A as being numbered 1-2048. For each such cache line CL, a single 15-bit tag (rounded to 16 bits, or 2-bytes, for convenience), is stored in Tag Store 30B making its size 4096 bytes, or 4 Kb of memory.

Furthermore, each cache line CL will comprise a certain number of cache line entries (CLE), e.g. 32 CLEs numbered 0-31 as indicated in FIG. 2A. Each entry CLE is a fixed size, e.g. 2-bytes, for storing a fixed number of host instructions. As described more fully below, if complete emulation of a given guest instruction cannot be completed with the host instructions stored in a given entry CLE, then a branch is made into a subroutine of host instructions stored in ROM 32 to continue host program execution.

The mapping between a guest instruction and the cache memory 30 is by the guest instruction program counter (PC) 34 shown also in FIG. 2A. For the example of a 1 Mb DR Cache 30A and concomitant 4 Kb Tag Store 30B, the PC 34 stores a 32-bit address word AW as shown. The least significant bit of the 32-bit address word AW may be ignored because the PC 34 is always assumed to be even. The next 5 least significant bits ($2^5=32$), identified as an Index, are used to index into one of the 32 CLEs 0-31 of a given cache line CL 1-2048. Since there are a total of 2048 cache lines, the next 11 bits of the address word AW of PC 34, identified as a cache line word CLW, are used to map directly to one unique CL 1-2048.

The remaining 15 bits ($2^{15}=2048$) of the address word AW are a tag T associated with the 2048 cache lines CL. The tag T can be ignored when mapping an address represented by word CLW into a unique cache line CL; however, the converse is not true, i.e., the tag T cannot be ignored when translating a cache line CL back into its corresponding address. This is because many addresses identified by CLW of the PC 34 map to the same unique cache line, i.e., the total number of legal addresses is much greater than the size of the DR Cache 30A.

With respect to the ROM 32 of FIG. 2B, there is shown four sections including an Interpretive Dispatch Table store 32A, a DR Offset Table store 32B, a DR Semantic Routines store 32C and an Interpretive Semantic Routines store 32D. These sections are contiguously located in ROM 32 in order to be mapped with a block address translation (BAT) register (not shown). Parenthetically, the several sections of cache 30 may be mapped in with page tables, so that it is not necessary for these to be contiguous.

In an aspect of the present invention, the translation emulator functions in conjunction with an interpretive emulator, one example of which is disclosed in co-pending U.S. patent application Ser. No. 08/378.071, filed Jan. 25, 1995, entitled "Method for Decoding Guest Instructions for a Host Computer", by Gary Davidian, and owned by, the Assignee of the present invention, which is incorporated by reference herein in its entirety. The Interpretive Dispatch Table store 32A and the Interpretive Semantic Routines store 32D, store host instructions that have been decoded in accordance with such an interpretive emulation scheme and are described in such co-pending application. Certain advantages discussed below are obtained with the present invention by making use of the Interpretive Dispatch Table store 32A and Interpretive Semantic Routines store 32D in combination with the translated host instructions stored in DR Cache 30A.

For a given entry CLE in a given cache line CL of the DR Cache 30A, the first host instruction is obtained from the Interpretive Dispatch Table store 32A and stored in the given entry CLE. The second host instruction stored in the given entry CLE is generated by indexing into the DR Offset Table store 32B. The offset accessed in this DR Offset Table is an offset into the DR Semantic Routines store 32C which contain the next host instruction for storage in the given entry CLE. Two other host instructions described more fully below will complete an entry CLE of emulating host instructions.

III. DR Cache Line Entries

The present invention may be utilized to emulate guest instructions running on any given type of processor. The specific embodiment described below will be with respect to Motorola 680X0 guest instructions that are emulated by host instructions that run on the PowerPC processor used in the Macintosh line of computers of Apple Computer. These guest instructions may be 2-byte, 4-byte or 6-byte instructions, termed herein "normal" instructions, or some other byte length, termed herein "special-case instructions."

Figure 3A:
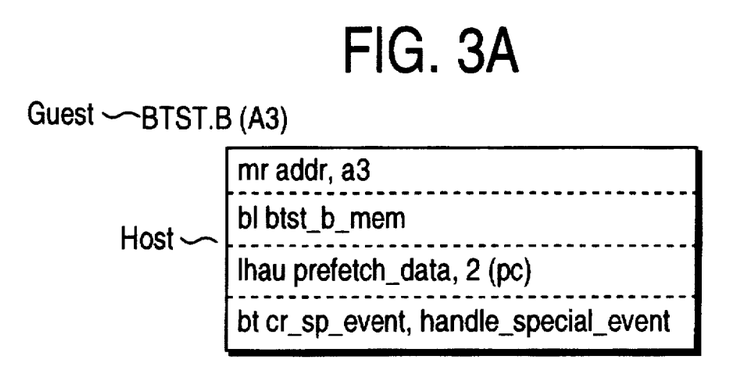
FIG. 3A and 3B illustrate, respectively, inline guest instructions emulated by host instructions of the present invention.
Figure 3B:
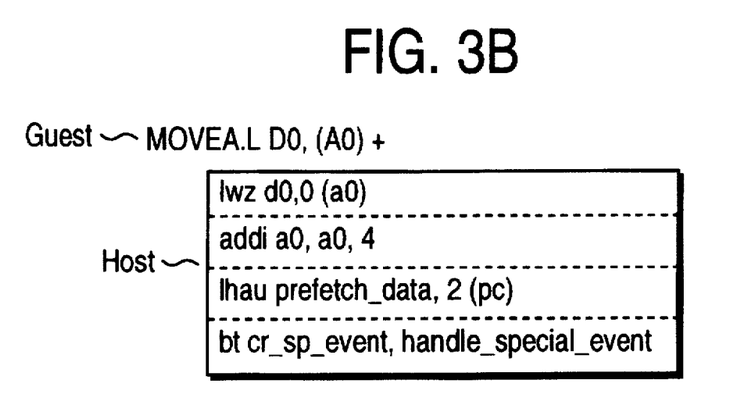

There are four types of special-case instructions, two of which are termed "inline" and "double inline" instructions. An "inline" guest instruction is one that can be emulated with two PowerPC instructions. FIG. 3A shows a 2-byte guest instruction BTST.B (A3) emulated by host instructions while FIG. 3B shows a 2-byte guest instruction MOVEA.L D0, (A0)+emulated by host instructions. As indicated in either of FIG. 3A and 3B, the first instruction in the given entry CLE is a host instruction (obtained from the Interpretive Dispatch Table 32A), while the second instruction is a branch-and-link into the set of DR Semantic Routines store of ROM 32C, thereby emulating the guest instructions, respectively, with only two host instructions. In both FIG. 3A and FIG. 3B, the third host instruction is one that increments the program counter PC 34 and loads in a word following the next instruction (which is used in decoding all 680X0 instructions greater than 2-bytes), while the fourth host instruction typically checks for interrupts or any other event which can occur on instruction boundaries.

Figure 4:
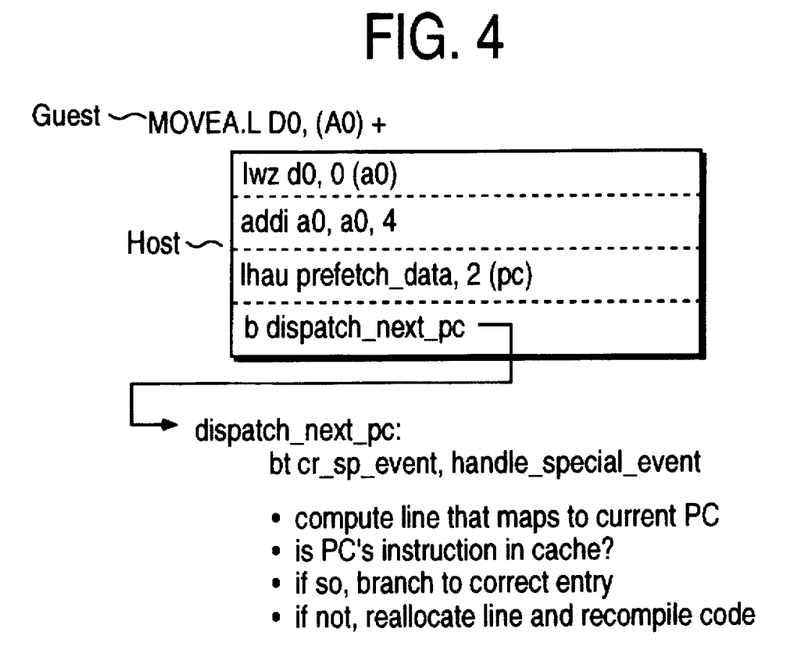
FIG. 4 illustrates one type of guest instruction that maps to the last entry of a line of the memory of the present invention.

The above are for those DR host instructions stored in entries CLE of a given cache line CL, except for the last entry in a line. DR host instructions that are stored in the last entry CLE of a given cache line CL of DR Cache 30A are slightly different than the host instructions shown in FIGS. 3A and 3B. FIG. 4 illustrates a guest instruction MOVE.L D0, (A0)+and its emulating host instructions stored in such a last entry CLE. Instead of falling through to the next DR instruction, the host instruction, as shown in FIG. 4, in the last entry of the given cache line CL is an unconditional branch (e.g., b dispatch_next_pc) to a routine (bt $cr_{13}$ sp_event, handle_special_event) which dispatches to the next DR cache line CL. This routine also will be responsible for allocating host instructions to a new cache line if necessary. In general, any host instruction that causes a change in the linear flow of a guest program (e.g. branches, jumps, traps, exceptions) will go through this dispatch routine.

Figure 5:
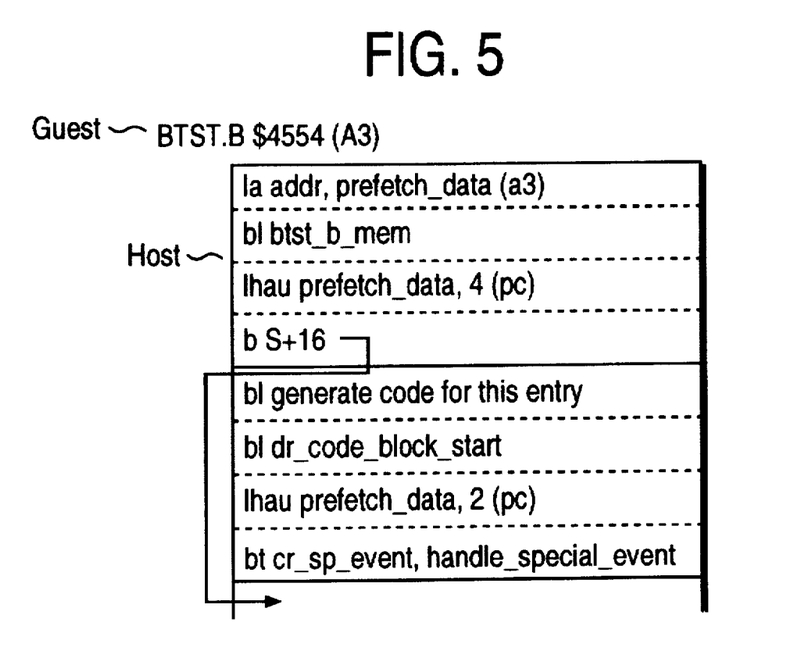
FIG. 5 illustrates the mapping of another type of guest instruction to memory line entries.

FIG. 5 shows DR host code stored in the DR Cache 30A for a guest instruction that is longer than 2-bytes. Dynamically recompiled code emulating a guest instruction longer than 2-bytes will take up more than a single cache line entry CLE. For example, as shown in FIG. 5, the DR code for a 4-byte Motorola guest instruction BTST.B $4554 (A3) will increment the program counter PC 34 by 4 (lhau prefetch data, 4(pc)) and skip the next cache line entry CLE. In general, a guest instruction that requires n-bytes will be emulated using n/2 cache line entries.

As also illustrated in FIG. 5, the last (b $+16) of the four host instructions in a cache line entry CLE does not check for interrupts or other exceptions, which is the case for any guest instructions that are longer than 2-bytes. In general, this will simply increase the interrupt latency. At a minimum, the emulator will check for interrupts at DR cache line boundaries, after any instruction that causes a change in program flow (branches, traps, etc.), and after any instruction that modifies a status register (not shown) of the Macintosh computer 10.

As described above, the DR code that is stored in the DR Cache 30A is dependent on the byte length of the guest instruction, i.e., a 2-byte guest instruction shown in FIG. 3A and 3B, a 4-byte instruction shown in FIG. 5 or greater. Implied in this is that the emulator must know the size of the guest instruction when dynamic recompilation occurs, and the DR Offset Table store 32B provides this information. More particularly, as indicated in FIG. 2B in connection with the DR Offset Table store 32B, there is contained 64K 2-byte entries, one for each possible 16-bit primary opcode. The low-order 2 bits of a 2-byte entry contain a flag which informs the emulator if the guest instruction is a 2-byte, 4-byte or 6-byte instruction. The decoding of this flag is as follows:

00: normal two-byte guest instruction
01: special-case guest instruction
10: normal four-byte guest instruction
11: normal six-byte guest instruction IV. Code Generation-For Normal Guest Instructions Host instructions are written to an entry CLE by invoking the dynamic recompiler. Initially, the dynamic recompiler obtains the first host instruction for the entry from the Interpretive Dispatch Table store 32A shown in FIG. 2B. The second host instruction is generated by indexing into the DR Offset Table store 32B. As discussed above, there is one table entry for each of the possible 16 primary opcodes in the DR Semantic Routine store 32C. The lower two bits of the table entry contain the previously described flag identifying the length of the guest instruction, while the high order 14 bits represent an offset into the DR Semantic Routine store 32C to access the host instructions that will complete the emulation of the given guest instruction. For normal 2-byte instructions, a branch-and-link instruction with the appropriate offset is computed for the second host instruction as shown in FIGS. 3A and 3B. For 4-and 6-byte instructions, the dynamic recompiler also modifies the third and fourth host instructions in the entry as explained above in relation to FIG. 5.

After the generated host instructions have been written to the given cache line entry CLE, the PowerPC's data cache is flushed, the instruction cache is invalidated, and an isync instruction (a Power PC instruction) is executed to discard any prefetched instructions from an instruction queue. Finally, the dynamic recompiler branches back to the code it just generated, and emulation continues. The entire recompilation process requires fewer than twenty PowerPC instructions in the average case.

V. Code Generation-For Special-Case Instructions

Some guest instructions do not fall into the normal 2-, 4-, or 6-byte categories. Those which don't are the special-case instructions mentioned above which are dynamically recompiled differently. When the emulator encounters a guest instruction with a special-case flag in the DR Offset Table store 32B, it uses the corresponding offset of table 32B to index into the DR Semantic Routines store 32C. A special code word is loaded from this location, which is 4-bytes in length and tells the emulator how to generate code for that guest instruction.

There are four main types of special cases: inline and double inline mentioned above, as well as, variable-length, and optimizations. Inline guest instructions, as already discussed above, are those which can be emulated by 2 host instructions. Inline guest instructions can be 2, 4, or 6-bytes in length.

Figure 6A:
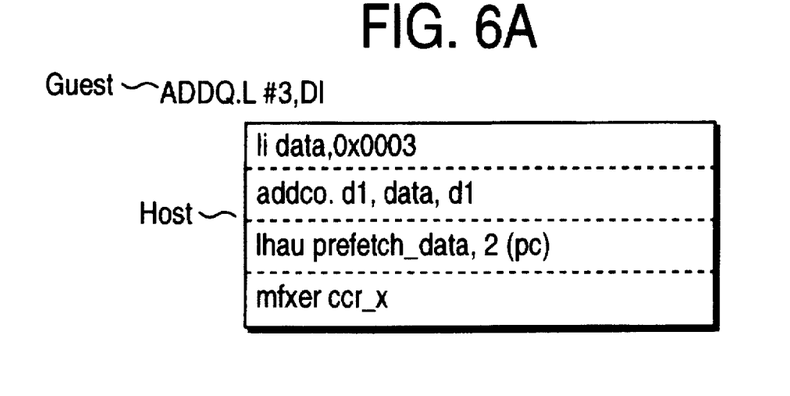
FIG. 6A and FIG. 6B illustrate double inline guest instructions and emulating host instructions stored, respectively, in a line entry and a line entry which is last in the line.

The second special case is "double inline" guest instructions. A relatively large subset of guest instructions for the Motorola 680X0 may be emulated in 3 host instructions. Consequently, instead of using the fourth host instruction in a cache line entry CLE to check for interrupts (see, for example FIG. 3A or FIG. 3B), this host instruction can be used to complete the dynamically recompiled emulation of the guest instruction. FIG. 6A illustrates a double inline guest instruction ADDQ.L #3, D1 and its corresponding 3 emulating host instructions (the fourth in the entry is mfxer ccr_x).

Figure 6B:
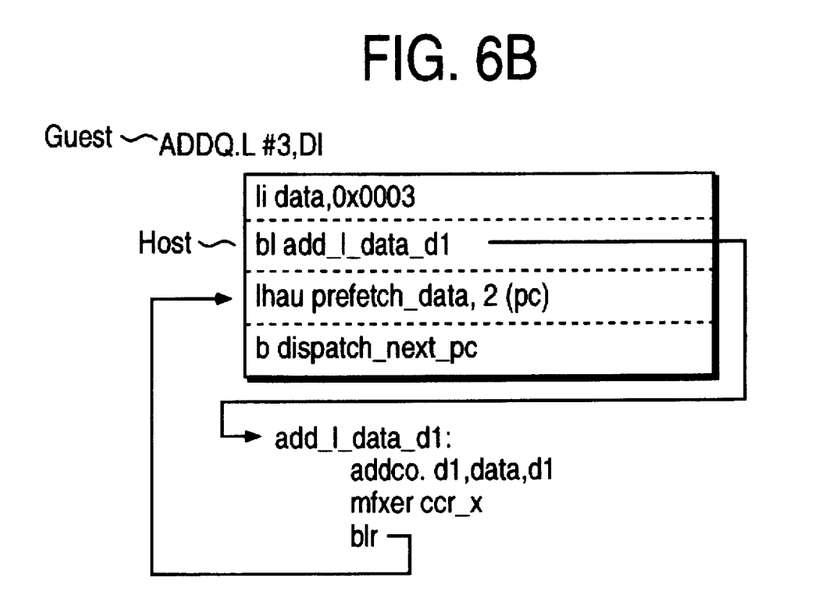

There are, however, some limitations to a "double inline" guest instruction. First, host instructions that fall within the last entry of a given cache line CL is not "double inlined". Thus, FIG. 6B illustrates the same guest instruction ADDQ.L #3, D1, as in FIG. 6A, but with host instructions in the last entry CLE of a cache line CL. Only two emulating host instructions are stored in the entry, with the second being a branch "l add_1_data_d1." Also, because the final emulating host instruction is executed after the program counter PC 34 is incremented via the third instruction lhau prefetch_data, 2(pc) in the entry, it cannot potentially cause a bus error. Therefore, the final instruction cannot access memory. Finally, only 2-byte guest instructions can be inlined.

The third type of special case code is for variable-length guest instructions, i.e., instructions that use an addressing mode which is an address register indirect with index and displacement or PC indirect with index and displacement addressing mode. These modes have "extended" versions which can require additional words of instruction and coding. Special case recompilation code would be necessary to compute the exact length of the instruction at recompilation time.

The fourth and final type of special case code is for optimizations specific to certain classes of guest instructions. There are currently three optimizations. First, short conditional branches that stay within the same cache line CL do not have to go through the generic "dispatch_next_PC" routine. Second, short unconditional branches that stay within the same cache line can do a single branch to the correct cache line entry CLE. Third, branches with word or long displacements normally force the emulator to check for a branch to an odd PC. These can be optimized in the normal case where the displacement is even.

VI. Translation Logic-Dynamic Recompiling

Figure 7:
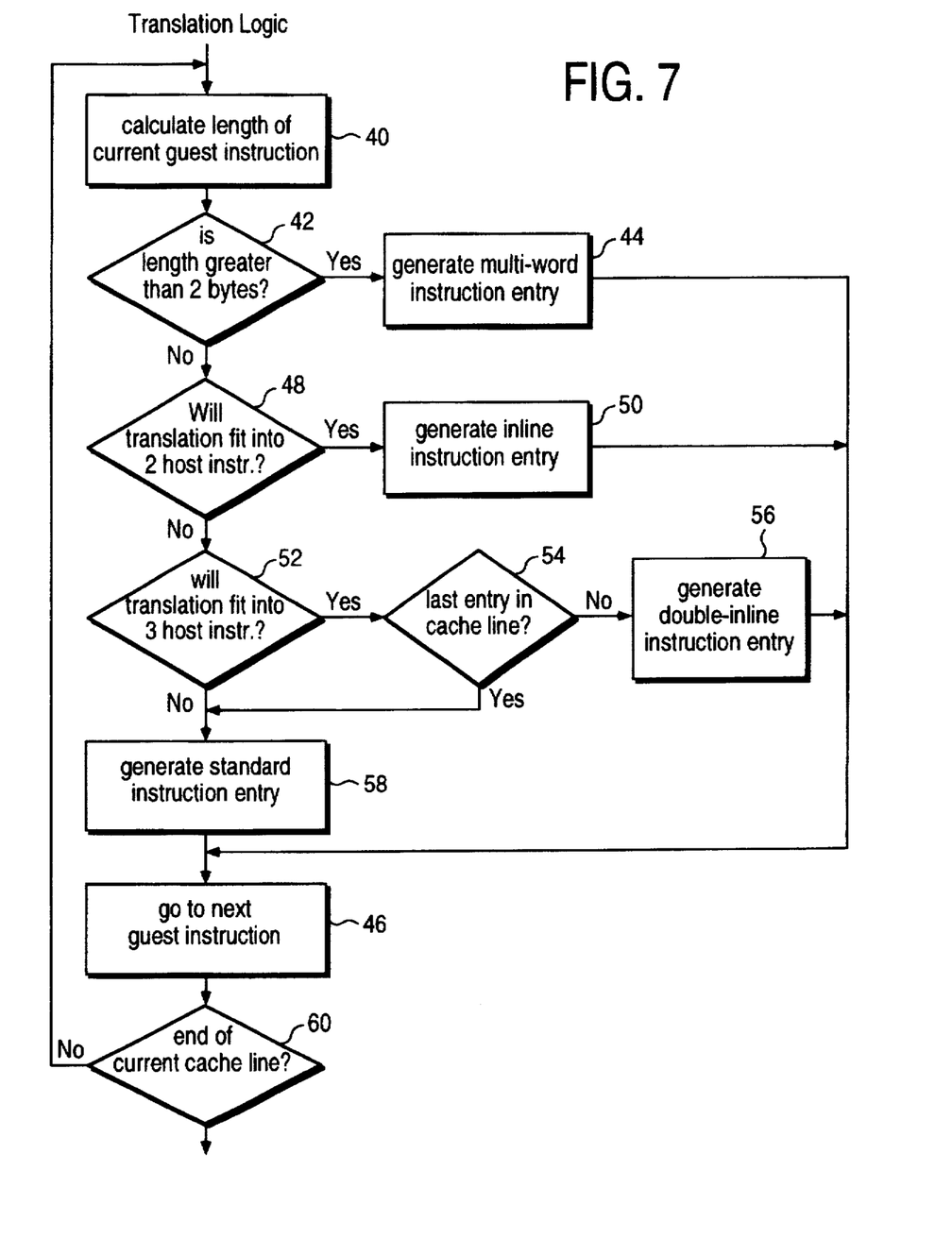
FIG. 7 is a flow diagram of translation logic of the present invention.

FIG. 7 illustrates a flow chart for dynamically recompiling or translating guest instructions to host instructions. First, the length of the current guest instruction is determined (Block 40) using the DR Offset Table 32B. If the guest instruction length is greater than 2-bytes (Block 42), then a multi-word instruction entry CLE is generated (Block 44) and the program proceeds to the next guest instruction (Block 46).

If the guest instruction length is not greater than 2-bytes (Block 42), and if the emulating host instructions are two in number (Block 48), then an inline host instruction entry CLE is generated (Block 50), i.e., these host instructions are written to the entry, such as is shown in FIG. 3A. If the dynamically recompiled host instructions are not two host instructions, but are three host instructions (Block 52), then a determination is made if the last entry CLE in a given cache line CL is being accessed (Block 54). If not, then a double inline instruction entry is generated (Block 56) such as is shown in FIG. 6A, and the program flows to the next guest instruction (Block 46). If the entry is not the last in a cache line (Block 60), the translation logic returns (Block 40); otherwise the translation logic exits.

If the entry is the last entry in the cache line (Block 54), or if the dynamically recompiled host instructions are not three in number (Block 52), then a standard instruction entry is generated (Block 58), and the flow continues to the next guest instruction (Block 46).

VII. DISPATCH LOGIC-Mapping, Cache Reallocation and Host Code Execution

Figure 8:
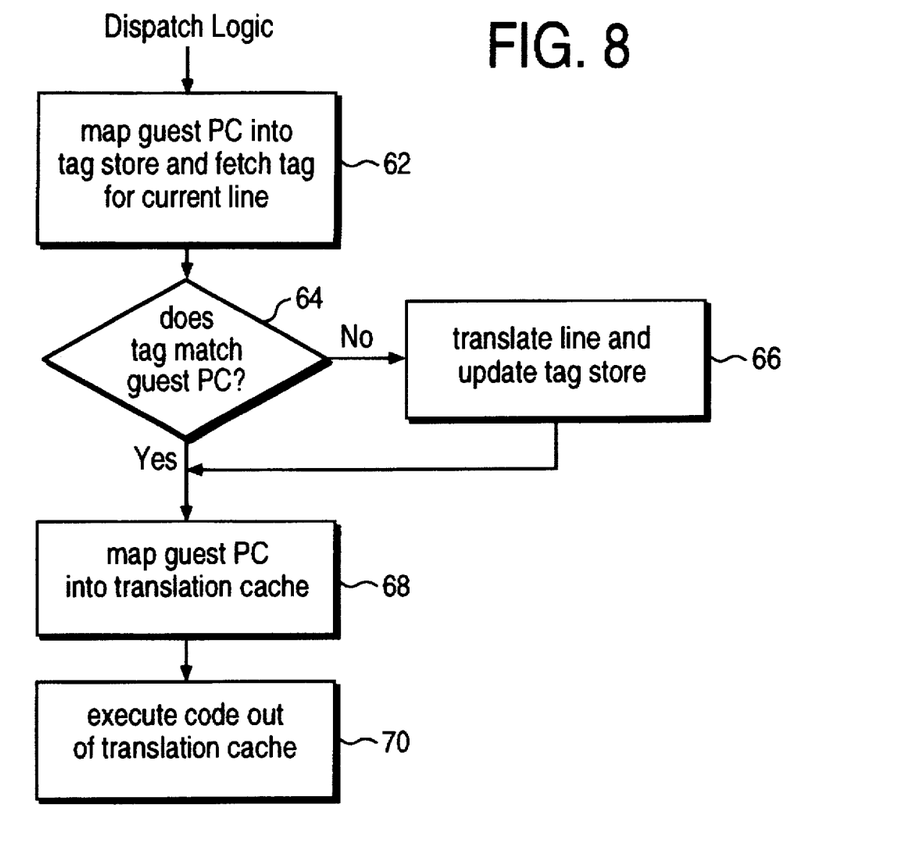
FIG. 8 is a flow diagram of dispatch logic of the present invention.

FIG. 8 is a flowchart used to describe PC mapping, cache reallocation if emulating host instructions are not currently stored in the cache, and host code execution. When a guest instruction is to be emulated first the guest PC 34, i.e., the address word AW, is mapped into the Tag Store 30B to fetch the stored tag for the current cache line (Block 62). The fetched tag is then matched against the address word AW. If there is no match (Block 64), this indicates that the required emulating host instructions are not currently stored in the DR Cache 30A. Consequently, the translation logic of FIG. 7 is called to recompile the cache line CL and the tag stored in the Tag Store 30B is updated with the AW of the guest PC (Block 66). After this, the same AW of the guest PC 34 is mapped into the DR code 30A, specifically the corresponding cache line CL and cache line entry CLE to access the appropriate host instructions (Block 68). Next, the accessed emulating host instructions are read from the DR Cache 30A and executed by the CPU 10 (Block 70). If the tag and AW of the guest PC 34 match (Block 64), the guest PC 34 is mapped to the DR cache 30A (Block 68).

VIII. DR Cache Flushing

When guest code is loaded into computer 10, or when guest code already loaded is modified, the operating system of the Macintosh computer 10 must notify the translating emulator of the present invention that guest code changes have occurred. In response, the translation emulator will be prompted to invalidate all of, or portions of, the host instructions stored in DR Cache 30A using a cache flushing routine employed in the Macintosh computer 10. Complete DR Cache flushing or invalidation is effected simply by storing invalid tags throughout the Tag store 30B. This is accomplished either by storing a given tag which will never appear in the legal address space of computer 10, or by adding a single bit to the given tag, i.e., an invalid bit, which can then be used to determine if the corresponding cache line CL contains valid cache line entries CLE. As described in relation to FIG. 5, the PC 34 tag and corresponding tag in Tag store 30B, utilize 15 bits, so the 16th bit in the tag of tag store 30B may be used as the bit to identify a valid or invalid cache line CL simply by making this a 1 (valid) or 0 (invalid).

Complete invalidation of the DR Cache 30A can be accomplished by writing $FFFF to all locations in the Tag store 30B. Alternatively, specific address ranges can be invalidated via a more complex method of comparing each tag in the Tag store 30B to tags in the given range.

Figure 9:
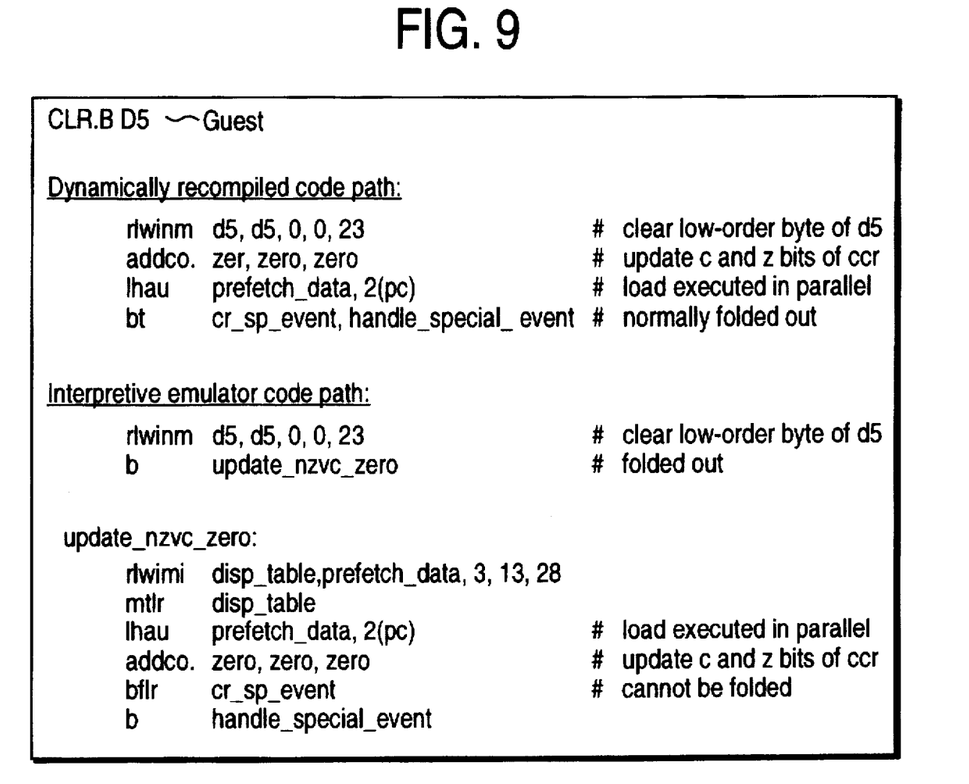
FIG. 9 illustrates emulator code paths for the translation emulator of the present invention and for a prior interpretive emulator each emulating a particular guest instruction.
Figure 10:
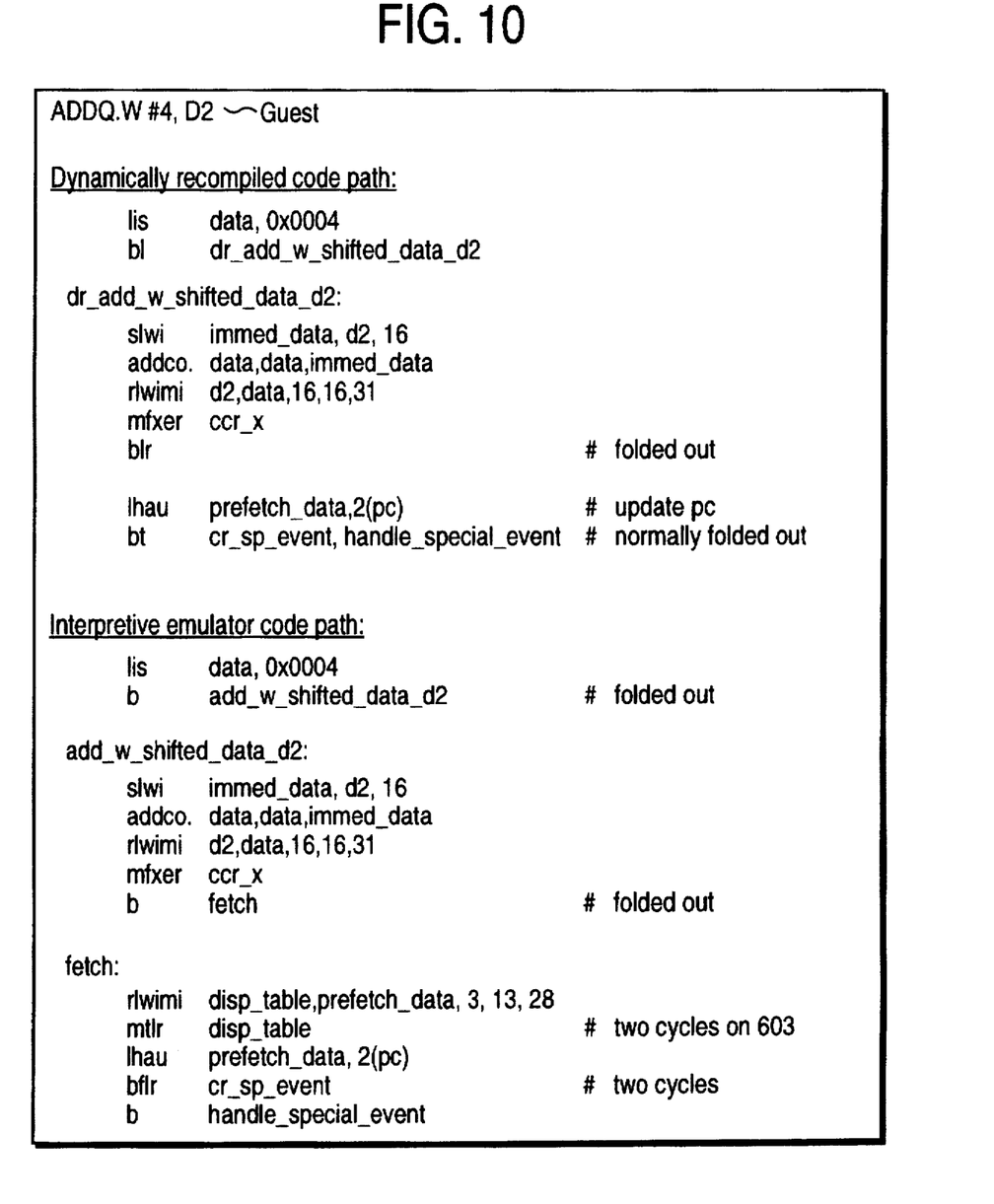
FIG. 10 is similar to FIG. 9 and shows emulator code paths for the translator emulator of the present invention and for a prior interpretive emulator each emulating another particular guest instruction.

IX. Comparison of Cycle Counts of Interpretive and Dynamically Recompiled Code Paths FIGS. 9 and 10 are used as examples to show comparisons of cycle counts for executing host instructions using a prior interpretive emulator and the translation scheme of the present invention. These are described with respect to execution on a specific processor, i.e., the Power PC 603 with the number of cycles being approximate to within 1 cycle depending on various factors such as the machine pipeline state. FIG. 9 shows the Motorola guest instruction BCLR.B D5 and the corresponding code paths for emulation performed using the interpretive emulator disclosed in the co-pending application incorporated by reference herein, and for emulation performed by the translation emulator of the present invention (which utilize certain aspects of the interpretive emulator as described above).

The cycle count for the interpretive emulator is 4, with one branch folded (b update_nuz_zero) and concurrent execution of host instructions (rlwimi/mth and lhau/addco). However, the cycle count for the DR code is only 2, with one branch folded (bt cr_sp_event, handle_special_event) and concurrent execution of host instructions (lhau/addco).

FIG. 10 shows examples of the emulator, dynamically recompiled and interpretive, for the Motorola guest instruction ADDQ.W #4, D2. The cycle counts for these two examples is more complex than those described in connection with FIG. 9, being dependent on the state of known general computer principles and hardware, including piplining and instruction buffers before the host instructions are executed. However, the DR code will generally take fewer cycles. Also of distinction is that the interpretive code path touches three hardware instruction cache lines whereas the DR code path touches only two. Furthermore, the host code emulating the next 680X0 guest instruction to be executed is already guaranteed to be in the instruction cache (see instruction: lhau prefetch_data, 2(pc)). The interpretive emulator a branch (instruction: b fetch) to the dispatch table (corresponding to the Interpretive Dispatch Table 32A of FIG. 2B) to execute the next instruction, making cache misses more likely.

What is claimed is:

1. A method of translating guest instructions to host instructions executable on a host processor, comprising:
   a. determining length of one of the guest instructions based on a dynamic recompiling offset table;
   b. generating a multi-word entry of host instructions in a memory if the length is greater than a certain number of bytes;
   c. generating an inline entry of host instructions in the memory if the guest instruction is not greater than the certain number of bytes and the inline entry constitutes a predetermined first number of host instructions; and
   d. returning to step a. to calculate the length of a next guest instruction.

2. A method, according to claim 1, wherein the predetermined first number of host instructions is two.

3. A method, according to claim 2, further comprising the step of generating a double inline entry of host instructions in the memory if the guest instruction is not greater than the certain number of bytes and the double inline entry constitutes a predetermined second number of host instructions, wherein the second number is greater than the first number.

4. method, according to claim 3, wherein the predetermined second number of host instructions is three.

5. A method of dispatching host instructions, corresponding to a guest instruction, executable on a host processor, comprising:
   a. storing the guest instruction in a first memory;
   b. generating an address having a first tag and corresponding to the guest instruction;
   c. storing in a line of a second memory a series of host instructions and a second tag corresponding to the series, wherein the series of host instructions are generated based on an interpretive dispatch table entry, wherein the interpretive dispatch table entry includes a first host instruction of the series of host instructions;

d. mapping the address to the second memory to access the second tag;

e. comparing the first tag and the second tag; and f. executing the series of host instructions if the first tag and the second tag match or filling the second memory with a second series of host instructions and a third tag corresponding to the first tag of the address if the first tag and the second tag do not match;

wherein the line of the second memory comprises a plurality of line entries;

wherein the step of filling comprises filling a line entry of the line of the second memory with the second series of host instructions and continuing to fill all other line entries of the line of the second memory with replacement host instructions; and wherein, if fewer than all of the line entries of the second memory are filled with host instructions emulating to a guest instruction, then the line entries of the second memory that are not filled with host instructions emulating to a guest instruction are filled with replacement host instructions which invoke a dynamic recompilation process.

6. A method of dynamically recompiling (DR) host instructions executable on a host processor and emulating guest instructions, comprising:

a. providing a first memory storing the host instructions by:

allocating an address space for an interpretive dispatch table, wherein each entry in the interpretive dispatch table includes a first host instruction for emulation of a guest instruction;

allocating an address space for a DR offset table; and allocating an address space for a DR semantic routine accessible via the DR offset table, wherein subsequent host instructions for emulation of the guest instruction are stored in the DR semantic routine;

b. providing a second memory having lines with line entries for storing dynamically recompiled host instructions; and c. copying [a] at least one host instruction from the first memory into a line entry of a line of the second memory.

7. A method, according to claim 6, wherein the step of copying comprises:

a. copying directly the first host instruction from the interpretive dispatch table into the line entry; and b. copying directly a second host instruction from the DR semantic routine into the line entry.

8. A method, according to claim 7, further comprising:

a. loading into the line entry a third host instruction for incrementing a program counter for a next guest instruction; and b. loading into the line entry a fourth host instruction for checking for events that may occur on instruction boundaries.

9. A method of translating a guest instruction to host instructions executable on a host processor, comprising:

determining if an entry of host instructions corresponding to the guest instruction is present in a memory;

if the entry of host instructions is not present in the memory, determining length of the guest instruction based on a dynamic recompiling offset table; and if the length of the guest instruction is greater than a predetermined number of bytes:

generating the entry of host instructions as a multi-word entry of host instructions; and storing the entry of host instructions in the memory.

10. A method of translating a guest instruction to host instructions executable on a host processor, comprising:

determining if an entry of host instructions corresponding to the guest instruction is present in a memory;

if the entry of host instructions is not present in the memory, determining length of the guest instruction based on a dynamic recompiling offset table;

if the length of the guest instruction is not greater than a predetermined number of bytes and a predetermined first number of host instructions emulate the guest instruction, generating the entry of host instructions as an inline entry of host instructions; and storing the entry of host instructions in the memory.

11. The method of claim 10, wherein the predetermined first number of host instructions is two.

12. A method of translating a guest instruction to host instructions executable on a host processor, comprising:

determining length of the guest instruction using a dynamic recompiling offset table;

generating an entry of host instructions as an inline entry of host instructions if the guest instruction is not greater than a predetermined number of bytes and the inline entry constitutes a predetermined number of host instructions.

13. The method of claim 12, wherein the step of generating an entry of host instructions further comprises generating an entry of host instructions using an interpretive dispatch table, wherein an entry in the interpretive dispatch table includes a first host instruction for emulating the guest instruction.

14. The method of claim 13, wherein the step of generating an entry of host instructions further comprises generating an entry of host instructions using a interpretive dispatch table and a dynamic recompiling semantic routine section, wherein the dynamic recompiling semantic routine section includes subsequent host instructions for emulating the guest instruction.

* * * * *